United States Patent [19]
Adachi et al.

[11] Patent Number: 5,689,882
[45] Date of Patent: Nov. 25, 1997

[54] METHOD OF PRODUCING A REAR WHEEL SPINDLE

[75] Inventors: Shigemitsu Adachi, Kasugai; Kazuo Nakagawa, Aichi-ken; Kiyoaki Tanidono, Kasugai; Masaharu Tsuboi, Wako, all of Japan

[73] Assignees: TRW Steering Systems Japan Co. Ltd., Aichi-ken; Honda Motor Co. Ltd., Tokyo, both of Japan

[21] Appl. No.: 527,072

[22] Filed: Sep. 12, 1995

[30] Foreign Application Priority Data

Dec. 8, 1994 [JP] Japan ................. 6-305180

[51] Int. Cl.$^6$ ................................ B21D 22/00
[52] U.S. Cl. ............... 29/898.1; 29/898.13; 72/356; 301/131
[58] Field of Search ............ 29/895.33, 898.1, 29/898.13, 898.14; 72/41, 53, 260, 343, 344, 352, 356; 301/131

[56] References Cited

U.S. PATENT DOCUMENTS

| | | | |
|---|---|---|---|
| 4,967,584 | 11/1990 | Sato et al. | 72/352 |
| 5,219,176 | 6/1993 | Mitchell | 72/356 |

FOREIGN PATENT DOCUMENTS

| | | |
|---|---|---|
| 2138207 | 11/1990 | Japan. |
| 647568 | 2/1994 | Japan. |

*Primary Examiner*—David P. Bryant
*Attorney, Agent, or Firm*—Tarolli, Sundheim, Covell, Tummino & Szabo

[57] ABSTRACT

A method of producing a spindle that can be easily press fit into a knuckled suspension arm with high productivity. A round bar is forged by a header to form a work in process part which is, in turn, thermally refined. If necessary, shot blast and lubrication are applied to the exterior surface of the work in process part. Subsequently, by rolling the work in process part, screw threads are formed on a male screw portion. The work in process part is set and finished in a press. The peripheral surfaces of the bearing attachment portion as well as the knuckle press fit portion of the work in process part are finished in a press. Since the surface of the knuckle press fit portion of the spindle is formed or extruded in the press, the portion can be easily press fit into a knuckled suspension arm with little resistance. The method of producing the spindle obviates the necessity of machining and grinding thereby providing enhanced productivity.

12 Claims, 7 Drawing Sheets

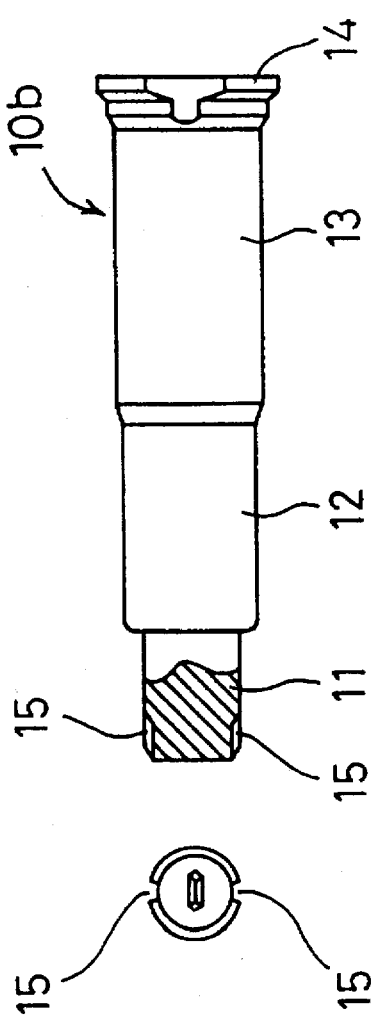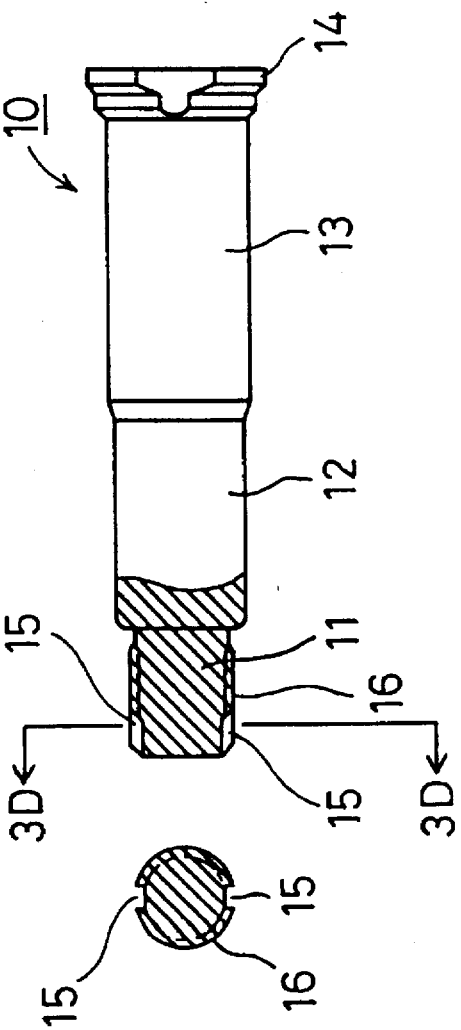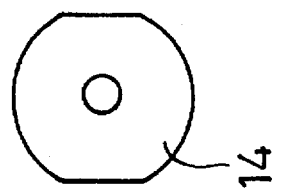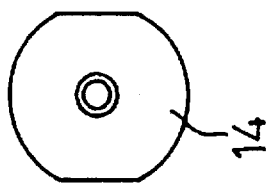

METHOD OF PRODUCING A REAR WHEEL SPINDLE

FIELD OF THE INVENTION

This invention relates to a spindle to be press fit into a knuckled suspension arm for supporting a vehicle wheel.

BACKGROUND OF THE INVENTION

Conventionally, as shown in FIGS. 6A, 6B, 6C, a rear wheel spindle 110 for supporting a vehicle's rear wheels is provided with a male screw portion 111, a bearing attachment portion 112, a knuckle press fit portion 113 and a flange portion 114. Further, a grinding relief 116 is formed in the boundary between the knuckle press fit portion 113 and the flange portion 114.

The conventional rear wheel spindle 110 is produced by the procedure shown in FIG. 7 and described below.

First, a round bar 101, cut to the desired length, is processed in a header to form a work in process part 102 having a configuration almost identical to that of the spindle 110 and being provided with the male screw portion 111, the bearing attachment portion 112, the knuckle press fit portion 113 and the flange portion 114. Subsequently, a grinding relief 116, for facilitating the subsequent grinding operations, is machined in the work in process part 102 at the boundary between the knuckle press fit portion 113 and the flange portion 114. Next, the machined work in process part 102 is thermally refined or heat treated, and screw threads are formed in the male screw portion 111 by rolling the work in process 102. Finally, the surface of the work in process part 102 is ground and finished. Specifically, the peripheral surfaces of the bearing attachment portion 112 and the knuckle press fit portion 113 are finished.

According to the method of manufacturing a conventional spindle 110, the grinding relief 116 is required in order for the knuckle press fit portion 113 to be finished by a grindstone. Through a microscopic observation, a number of micro protrusions are seen on the grinding surface of the knuckle press fit portion 113. Such protrusions build up resistance when the spindle 110 is press fit into a knuckled suspension arm for use.

The grinding relief 116 is required for a conventional vehicle rear wheel spindle 110. The finish grinding of the bearing attachment portion 112 and the knuckle press fit portion 113 requires a number of machining steps. Therefore, productivity is deteriorated and production cost is increased.

SUMMARY OF THE INVENTION

Wherefore, an object of the present invention is to provide a spindle having no micro-protrusion thereon, so that it can be smoothly and easily press fit into a knuckled suspension arm of a vehicle.

Another object of the present invention is to provide a method of producing the spindle with high productivity, thereby obviating the necessity of a grinding step.

To attain the first object, the invention provides a spindle in which the peripheral surfaces of the knuckle press fit portion and the bearing attachment portion are in an extrusion operation. Since the peripheral surfaces of the press fit portion and the bearing attachment portion are extruded or compressed, no micro-protrusions can be seen on the spindle, even through a microscopic observation. The surface of the spindle is finished with an extremely and evenly smooth finish.

Due to the extremely smooth finish, the force required to press fit the spindle into the knuckled suspension arm is reduced or unchanged, and the clearance between the knuckle press fit portion and the knuckled suspension arm, i.e. the difference between the outer diameter of the knuckle press fit portion and the inner diameter of the knuckled suspension arm, is remarkably reduced.

The knuckle press fit portion of the spindle may be tapered (e.g. a decreasing taper) toward the bearing attachment portion. With this structure, the spindle can be even more easily press fit into the knuckled suspension arm.

To attain the second object, the invention provides a method of producing the spindle composed of the steps of forging a spindle configuration provided with a male screw portion, a bearing attachment portion, a knuckle press fit portion and a flange portion, and of processing the bearing attachment portion and the knuckle press fit portion in a press in order to finish the peripheral surface of the spindle.

In the present method of manufacturing the spindle, the peripheral surfaces of the bearing attachment portion and the knuckle press fit portion of the spindle are pressed through a finishing die. The peripheral surfaces of the bearing attachment portion and the knuckle press fit portion are extruded by the finishing die and are thereby provided with a highly smooth finish with no micro-protrusions. The spindle, which allows the press fit load to be reduced, can be easily and economically produced in the above manner.

In the present method, the number of process steps required to produce the spindle 10 is reduced because the finishing grinding with a grindstone the machining of the grinding relief for facilitating the finish grinding are not necessary.

Consequently, according to the method of the present invention, a spindle having high performance can be produced at a relatively low cost.

BRIEF DESCRIPTION OF THE DRAWINGS

The invention will now be described, by way of example, with reference to the drawings, in which:

FIGS. 3A, 3B and 3C are: a left end view; a front elevational view partly in section; and a right end view, respectively, of the work in process part of a spindle according to the invention, and FIGS. 3D, 3E and 3F: are a cross sectional view, taken along line 3D—3D in FIG. 3E; a front elevational view partly in section; and a right end view, respectively, of the finished work of a spindle according to the invention;

DETAILED DESCRIPTION OF THE PREFERRED EMBODIMENTS

Figure 1:
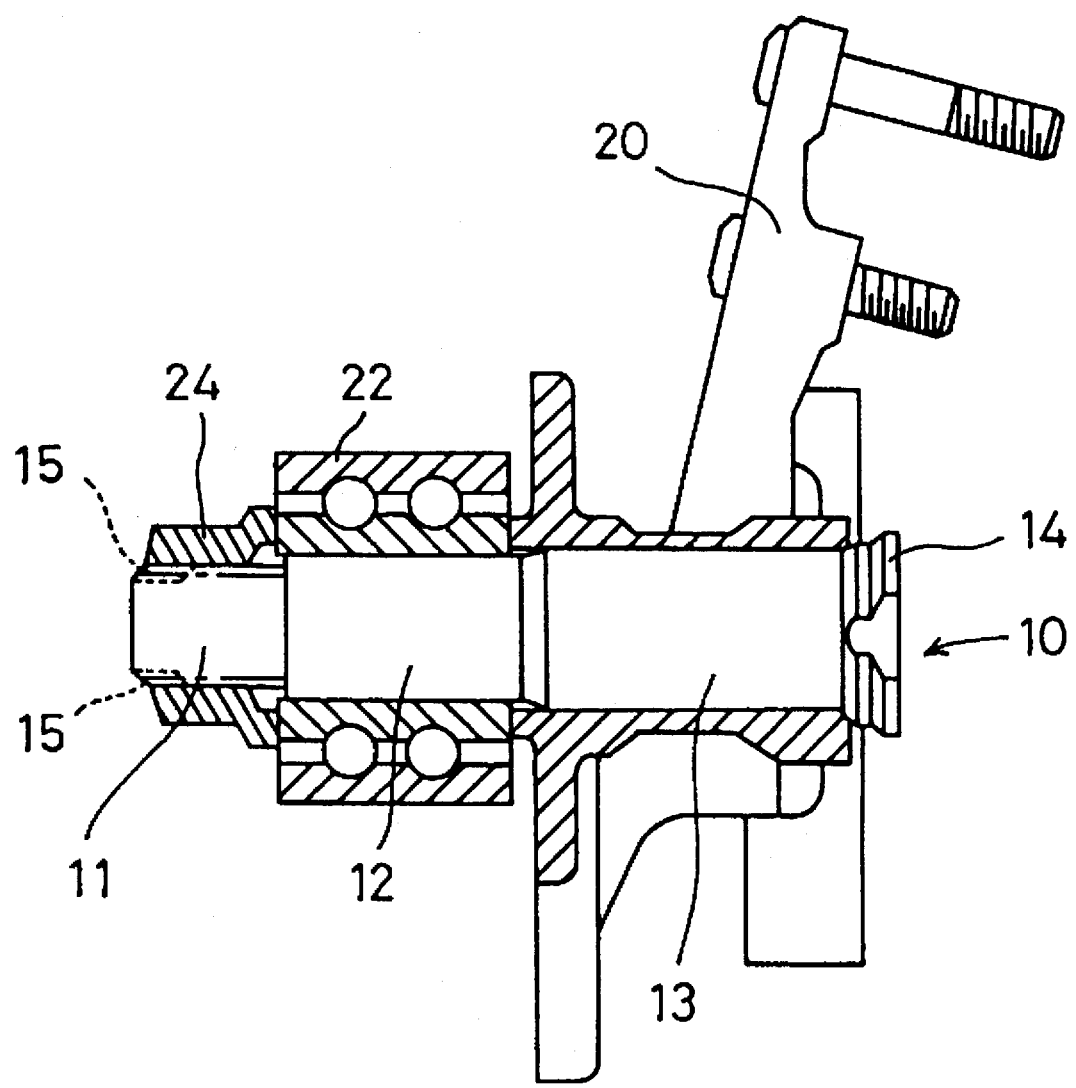
FIG. 1 is a cross-sectional view of a vehicle rear wheel spindle, embodying the invention, assemble into a knuckled suspension arm.

As shown in FIG. 1, a rear wheel spindle 10 for a front engine, front wheel drive vehicle is composed of a male screw portion 11, a bearing attachment portion 12, a knuckle press fit portion 13 and a flange portion 14. The rear wheel spindle 10 is mounted to a vehicle's rear wheel knuckled suspension arm 20 by press fitting the knuckle press fit portion 13 into the knuckled suspension arm 20, attaching a rear wheel bearing 22 to the bearing attachment portion 12 and fastening a flanged caulking nut 24 around the male screw portion 11. A caulked groove 15 is formed in the male screw portion 11 when fastening the flanged caulking nut 24.

Figure 2:
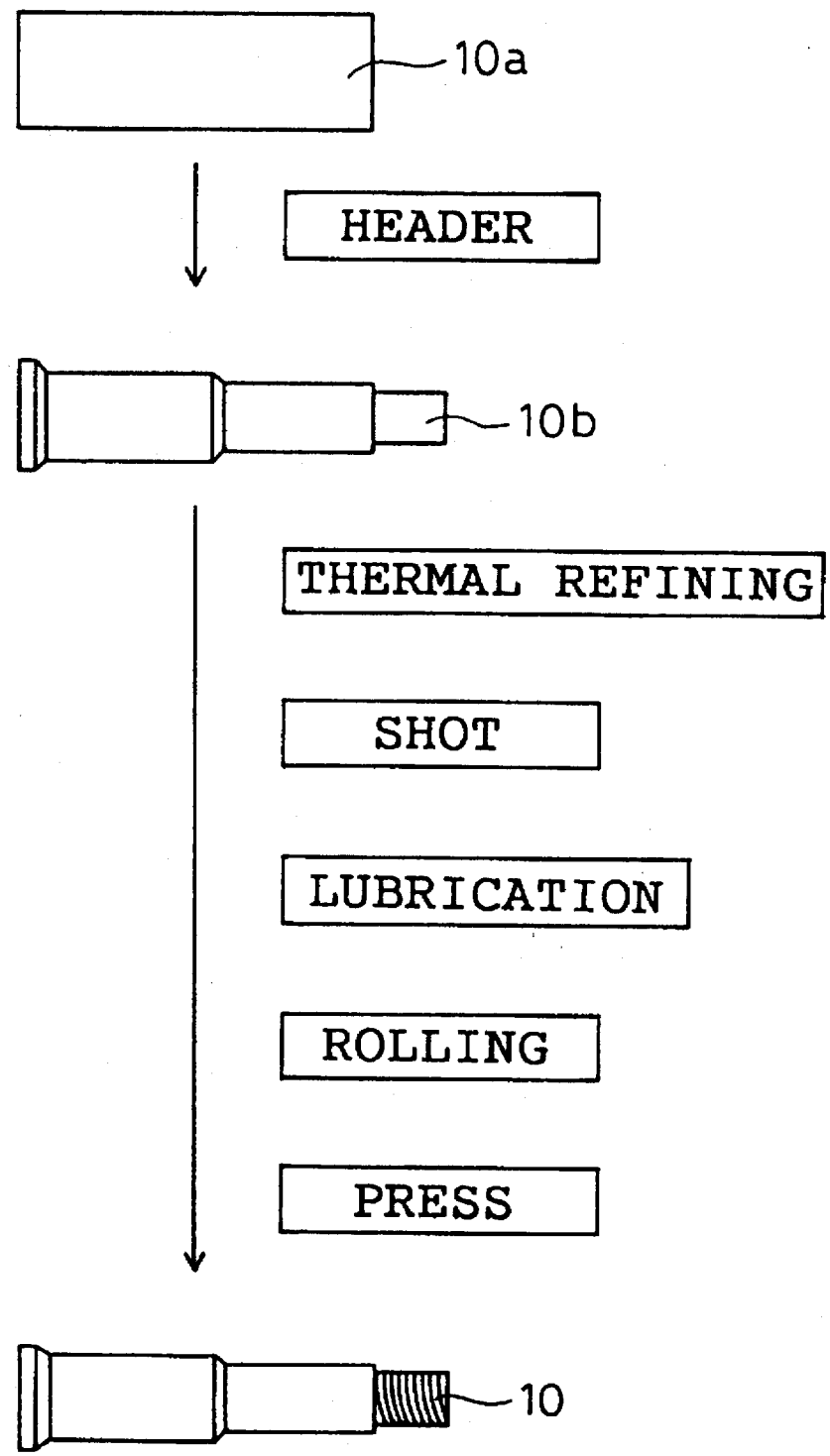
FIG. 2 is an explanatory view illustrating the process of producing the spindle according to the invention in which the knuckle press fit portion is shown as slightly tapering toward the bearing attachment portion.

The spindle 10 is produced by the procedure illustrated in FIG. 2 and explained below.

A round bar 10a is first cut to the desired length and forged with a header to form a work in process part 10b having a spindle configuration that is almost the final configuration 10 shown in FIGS. 3A, 3B and 3C. Specifically, the work in process part 10b is formed of the male screw portion 11 (minus threads), the bearing attachment portion 12, the knuckle press fit portion 13 and the flange portion 14. In the work in process part 10b, the caulking groove 15 is also formed in the male screw portion 11. Since the flange portion 14 is formed with two steps, the work in process part 10b is formed with a five stepped header.

The work in process part 10b is then thermally refined. During thermal refining, an oxidized coating might form on the surface of the work in process part 10b. Therefore, if required, shot blast can be applied to the surface of the work in process part 10b before lubrication is applied to the surface. By applying the shot blast, the oxidized coating can be removed from the surface and the lubricating coating can be securely attached to the surface.

Screw threads are formed on the male screw portion 11 by rolling the work in process part 10b.

Figure 4:
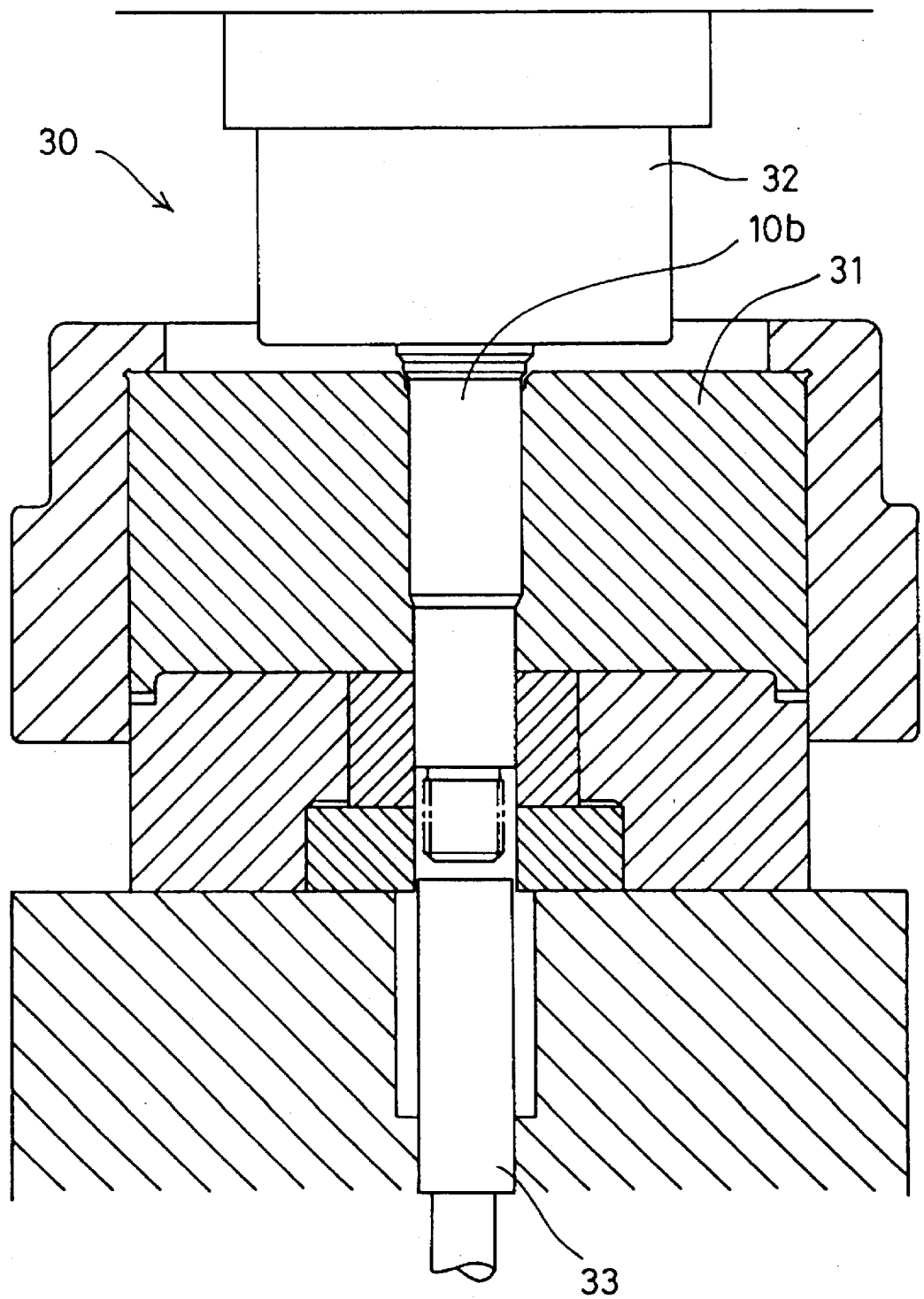
FIG. 4 is a cross-sectional view of a finishing press for use in the invention.
Figure 5:
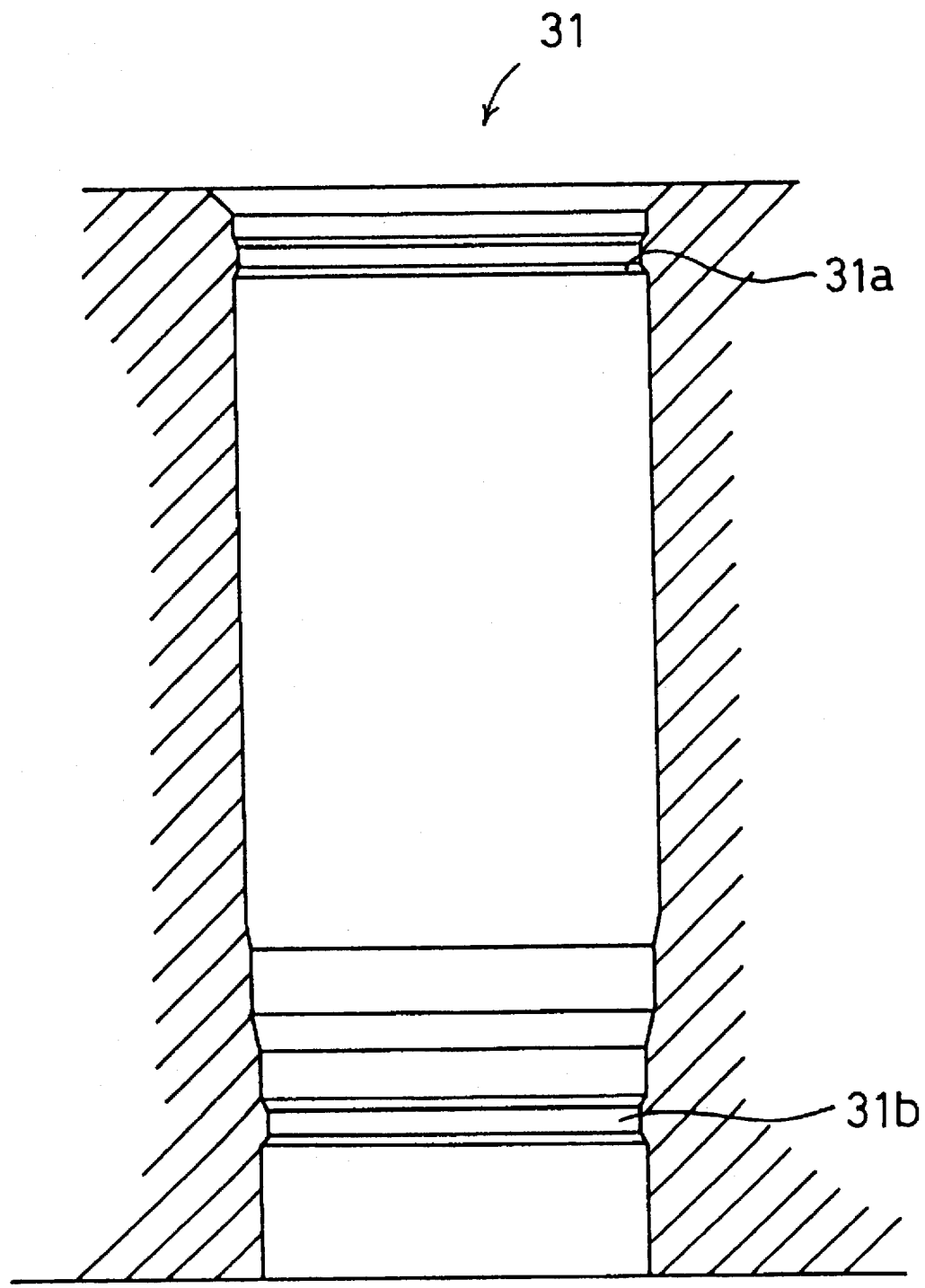
FIG. 5 is a cross-sectional view of a finishing die for use in the invention.
Figure 6C:
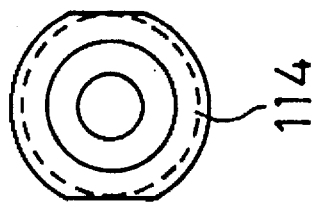
FIGS. 6A, 6B and 6C are: a left end view; a front elevational view partly in section; and a right end view, respectively, of a conventional vehicle rear wheel spindle.
Figure 6B:
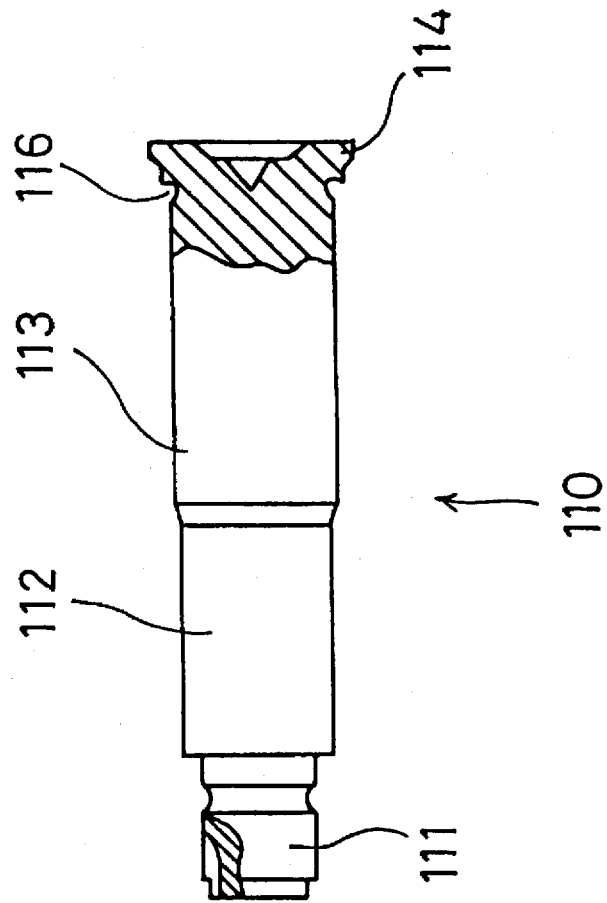
Figure 6A:
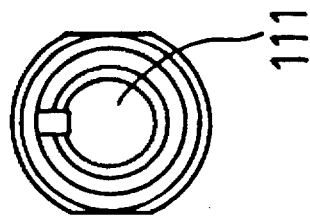
Figure 7:
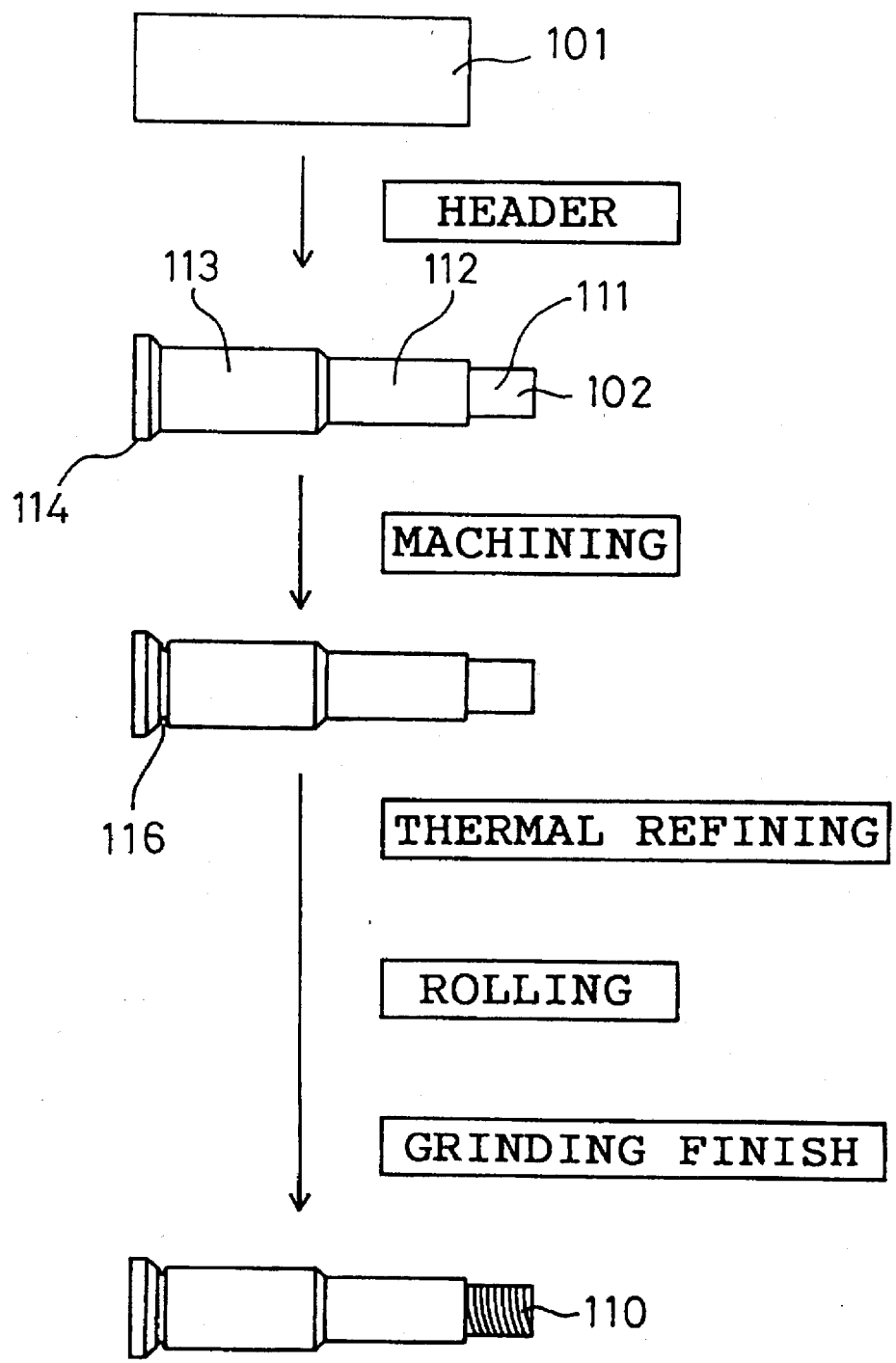
FIG. 7 is an explanatory view showing the process steps for producing the conventional vehicle rear wheel spindle.

Lastly, as shown in FIGS. 4 and 5, the work in process part 10b is set in a press 30. The peripheral surfaces of the bearing attachment portion 12 and the knuckle press fit portion 13 are finished in the finishing press 30.

The shot blast and lubrication are applied to the surface of the work in process part 10b to facilitate finishing in the press 30. During application of the shot blast and lubrication, the work in process part can be handled in batches of large quantities. Consequently, as shown in FIGS. 3D, 3E and 3F, a finished work, comprising spindle 10, with screw threads 16 rolled on the male screw portion 11, is discharged from the press 30.

The work in process part 10b is cold worked in the header and in the press.

The material of spindle 10 is preferably boron steel. The peripheral surfaces of the bearing attachment portion 12 and the knuckle press fit portion 13 that are finished in the press 30, have a surface roughness of 2S in the unit according to Japanese Industrial Standards, whereas the bearing attachment portion 112 and the knuckle press fit portion 113 finished by the conventional grinding process have a surface roughness of 6S. The spindle 10 of the embodiment is thus provided with a relatively smooth exterior surface so that it can be more easily press fit in the knuckled suspension arm 20.

As shown in FIG. 4, in order to press finish the surface of the work in process part 10b, the work in process part 10b is set in a metal finishing die 31, incorporated in the press 30. Subsequently, the work in process part 10b is driven downward by a ram 32. After the peripheral surfaces of the work in process part 10b are diametrically finished in the press 30, a discharging rod 33 is moved upwardly, as viewed in that figure, and the partially finished spindle 10 is discharged from the press 30.

The metal finishing die 31 is provided with a relatively large diameter portion 31a and a relatively small diameter portion 31b. When the bearing attachment portion 12 is pressed through the relatively small diameter portion 31b, the outer periphery of the bearing attachment portion 12 has a very smooth finish. When the knuckle press fit portion 13 is passed through the relatively large diameter portion 31a, positioned in the upper part as viewed in that figure, the outer periphery of the knuckle press fit part 13 simultaneously receives a very smooth finish.

Since the bearing attachment part 12 and the knuckle press fit portion 13 are finished in the press 30, no micro-protrusions are formed on the exterior surface of the spindle 10 that can be observed with a microscope. A spindle 10 with a relatively smooth surface, as compared with a conventionally manufactured spindle 110, can be more easily press fit into the knuckled suspension arm 20 than a conventionally manufactured spindle 110.

When attaching the bearing 22 to the bearing attachment portion 12, the bearing 22 can closely abut against the bearing attachment portion 12, because no micro-protrusions are formed on the surface of the bearing attachment portion 12.

The number of process steps is decreased according to the present invention, compared with the conventional method of producing the spindle, because the spindle is finished in the press. Therefore, no grinding relief needs to be formed on the surface of spindle for finishing the spindle according to the present invention. The productivity is therefore greatly enhanced.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

For example, although in the embodiment the knuckle press fit portion 13 has the same diameter along its length, the knuckle press fit portion 13 can be tapered such that is slightly enlarged toward the flange portion 14 (See FIG. 1). The tapered knuckle press fit portion can be even more easily press fit into the knuckled suspension arm 20. The tapered configuration can be easily formed in the press. In the conventional finish by grinding, the angle at which the grindstone contacts the work in process part needs to be precisely adjusted. In the press, the tapered configuration can be easily formed simply by using a tapered metal finishing die.

What is claimed is:

1. A method of producing an elongate spindle, said method comprising the steps of:

forging a piece of raw material into a work-in-process part having a spindle configuration in which said spindle configuration comprises a male screw portion, a bearing attachment portion, a knuckle press fit portion and a flange portion; and placing said work-in-process part in a press and finishing peripheral exterior surfaces of said bearing attachment portion and said knuckle press fit portion with said press such that said exterior surfaces are substantially devoid of any micro-protrusions.

2. The method according to claim 1 further comprising the step of, prior to placing the work-in-process part into the press, thermally refining the work-in-process part.

3. The method according to claim 2 further comprising the step of, after the thermally refining step, at least one of:

(1) applying a shot blast to the exterior surface of the work-in-process part to remove an oxidizing coating formed thereon; and (2) applying lubrication to the exterior surface of the work-in-process part.

4. The method according to claim 1 further comprising the step of rolling said male screw portion of said spindle to form screw threads thereon.

5. The method according to claim 1 further comprising the step of employing a five-stepped header to forge said raw material into said work-in-process part.

6. The method according to claim 5 wherein the steps of forging said raw material in the header and finishing the peripheral exterior surfaces in the press are performed at cold temperature.

7. The method according to claim 6 further comprising the step of providing the press with a discharge rod for removing said spindle, once finished, from the press.

8. The method according to claim 1 wherein said finishing step comprises finishing both said bearing attachment portion and said knuckle press fit portion at the same time.

9. The method according to claim 1 further comprising the step of providing the press with a finishing die which includes a relatively large diameter portion for finishing the exterior surface of said knuckle press fit portion, a relatively small diameter portion for finishing the exterior surface of said bearing attachment portion, and a ram to drive said work-in-process part into said die.

10. The method according to claim 1 further comprising the step of manufacturing said spindle from boron steel.

11. The method according to claim 1 further comprising the step of finishing the exterior surface of said knuckle press fit portion and said bearing attachment portion to have a Japanese Industrial Standard surface roughness of about 2S.

12. The method according to claim 1 further comprising the step, after the thermally refining step, of at least one of:

(1) applying a shot blast to the exterior surface of the work-in-process part; and (2) applying lubrication to the exterior surface of the work-in-process part;

wherein said at least one step is applied to a plurality of work-in-process parts at the same time.

* * * * *